W. H. ORTMAN.
CLOTHESLINE SUPPORT.
APPLICATION FILED OCT. 27, 1919.

1,368,650.      Patented Feb. 15, 1921.

Inventor:
William H Ortman
By Young & Young
Attorneys.

UNITED STATES PATENT OFFICE.

WILLIAM H. ORTMAN, OF MILWAUKEE, WISCONSIN.

CLOTHESLINE-SUPPORT.

1,368,650.  Specification of Letters Patent.  Patented Feb. 15, 1921.

Application filed October 27, 1919. Serial No. 333,571.

*To all whom it may concern:*

Be it known that I, WILLIAM H. ORTMAN, a citizen of the United States, and resident of Milwaukee, in the county of Milwaukee and State of Wisconsin, have invented certain new and useful Improvements in Clothesline-Support; and I do hereby declare that the following is a full, clear, and exact description thereof.

My invention relates to new and useful improvements in supports for clothes lines or other flexible members, more particularly of that type adapted to clamp the flexible member which is drawn therethrough and thus retain a taut relation thereof.

It is in general the object of my invention to simplify and otherwise improve the structure and to increase the efficiency and ease of manipulation of devices of this character.

It is more particularly my object to provide an arrangement for procuring a positive clamp action upon release of the initial tension of the clothes line support or other flexible member which is secured, this positive clamp action being effected by movement of the roller member about which the line is trained to procure its tension.

With the above and other objects and advantages in view, which will be apparent as the description proceeds, my invention resides is the novel features of construction, combination and arrangement of parts which will be hereinafter more particularly described and defined by the appended claims.

Figure 1:
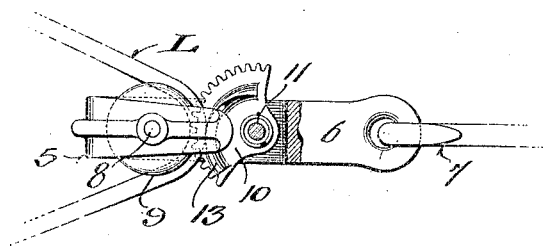
Figure 1 is a plan view of a clothes line support embodying my invention, a portion thereof being broken away to more clearly show the structure.
Figure 2:
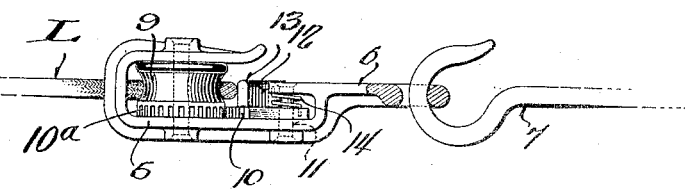
Fig. 2 is a side elevational view of the support.

Referring now more particularly to the accompanying drawings, the embodiment of my invention shown in Figs. 1 and 2 comprises a substantially U-shaped body member 5, one arm of which is projected past the free end of the other arm and provided with an inwardly offset extension 6 which is apertured for engagement on a securing hook 7 of a post or other primary support member. A journal pin 8 has its ends secured in the intermediate portions of the legs of the body member 5, and a pulley 9 is mounted on this pin, having its periphery concave for the reception of the clothes line L or other flexible member which is to be supported. One side of the pulley is provided with an annular series of gear teeth $10^a$ meshing with a gear segment 10 which is pivotally mounted on a pin 11 secured in the projected leg of the body member 5 and in a lug 12 extending inwardly from the offset extension 6. This gear segment carries a cam rib 13 which is disposed in opposition to the periphery of the roller. The gear segment is yieldably urged in the direction of inward inclination of the cam rib by a spring 14 coiled on the pin 11 between the gear segment and the lug 12 and having its ends secured respectively to these members.

In the operation of this form of the device, the line L is trained about the pulley as indicated in Fig. 1 and then drawn to a desired tautness. In this operation the tendency of the pulley 9 to rotate due to the friction of the line thereagainst is resisted by the spring 14 through the intermeshing gear teeth 10 and $10^a$. As the operator releases his grip on the end of the line, the taut nature of the line and its frictional resistance on the pulley aids the spring 14, thus causing the pulley and gear segment to rotate together owing to their intermeshing teeth and causing the cam rib 13 to engage the line and clamp said line firmly against the pulley, whereby the clothes line will be supported in a desired taut relation. It is noted that the spring 11 causes the cam member which is to be formed by the rib 13 to exert a clamping action just as soon as the operator slackens his pull on the end of the line. It is to be further noted that the cam member and opposed surface both move in the same direction to procure the clamping action, thus tending to eliminate the possibility of slippage. Attention is further directed to the compact relation of parts procured and to the distribution of tension stresses in a longitudinal line from end to end of the device.

Figure 3:
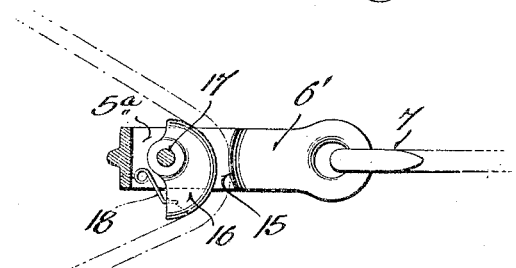
Fig. 3 is a sectional view of a modified form of my improved support.

In the modified structure of Fig. 3, I provide a U-shaped body member $5^a$, similar to the body 5 of the aforedescribed structure, and having one leg projected past the free end of the other leg and provided with an offset securing extension 6' which forms a clamping shoulder 15 at its junction with the major portion of the body member. A substantially semi-circular member 16 is eccentrically pivoted on a pin 17 extending between the legs of the body member 5ª, this semi-circular member being adapted to receive the line thereabout and thus forming what may be termed a semi-circular pulley member, although the pulley function is only exercised in rocking action of the member. The end portion of the member 16 which has the greater radius is resiliently urged toward the shoulder 15 by a spring 18. Thus, in operation, the line is trained about the member 17 and drawn to its desired tautness. As the operator releases his pull on the line, the member 16 will rock, partially under influence of its spring 18, but primarily under the tension pull of the major stress of line, thus firmly clamping the line between the clamp surface of the shoulder 15 and the periphery of said member 16.

Figure 4:
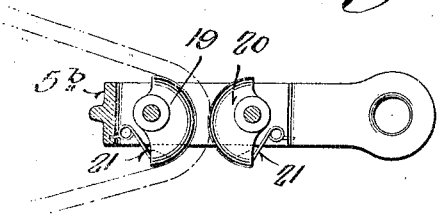
Fig. 4 is a view similar to Fig. 3, but showing a still further modification.

Fig. 4 shows a still further modification wherein a pair of semi-circular cam members 19 and 20 are clamped between the legs of the U-shaped body member 5ᵇ and have their end portions of greater radius urged together by springs 21. In the operation of this form of the device, various of the advantages of the structures as shown in Figs. 1 and 2 are procured, inasmuch as both of the clamp surfaces are moved in the clamping action, and inasmuch as a positive clamping engagement is secured by direct clamp action of the member about which the cord is trained for tension.

While I have shown and described preferred embodiments of my invention, it will be appreciated that various changes and modifications of structure may be employed without departing from the spirit of my invention as set out in the appended claims.

What is claimed is:

1. A device of the class described comprising a U-shaped body member having one of its legs projected past the free end of the other leg and provided with an inwardly offset extension adapted to be secured to a support, a pulley mounted between the legs of the body member, and a rotatable clamp disposed between said pulley and said extension, said clamp having an eccentric portion engageable with a line trained about the pulley upon rotation of said clamp in one direction, a spring urging said clamp to rotative movement in the direction of said engagement and a gear connection between said pulley and said clamp whereby the rotative force transmitted to the pulley by the friction of the line will act in opposition to the spring when the line is drawn in one direction and will reinforce the spring when the line is drawn in the opposite direction.

2. A device of the class described comprising a body member, a pulley rotatably mounted on the body member and adapted for rotation relative to the body member by the friction of the line trained about said pulley, a clamp rotatably mounted on said body member adjacent to said pulley, said clamp having an eccentric portion engageable with the line trained about the pulley upon rotation of said clamp in one direction, a spring urging said clamp to rotative movement in the direction of said engagement, and a gear connection between said pulley and said clamp whereby the rotative force transmitted to the pulley by the friction of the line will act in opposition to the spring when the line is drawn in one direction, and will reinforce the spring when the line is drawn in the opposite direction.

In testimony that I claim the foregoing I have hereunto set my hand at Milwaukee in the county of Milwaukee and State of Wisconsin.

WILLIAM H. ORTMAN.